ly known as dehydrocholic acid and the name is occasionally used hereinunder) is easily prepared from cholic acid being a main component in human bile acid, by oxidation with chromium oxide in glacial acetic acid, and possesses a superior hydrocholeretic action but shows undesirable side effects such as lowering of the liver function. It has now been studing to find out a superior choleretic agent without side effects.

United States Patent Office 3,534,070
Patented Oct. 13, 1970

3,534,070
3,7,12-TRIKETOCHOLANYL-α-AMINO ACIDS
Shigeru Aonuma, Toyonaka-shi, Toshiaki Kadokawa, Hirakata-shi, and Hidehiko Kaneko, Minoo-shi, Japan, assignors to Dainippon Pharmaceutical Co., Ltd., Osaka, Japan, a corporation of Japan
No Drawing. Filed Mar. 12, 1968, Ser. No. 712,353
Int. Cl. C07c 169/50
U.S. Cl. 260—397.1   5 Claims

ABSTRACT OF THE DISCLOSURE

The α-amino acids derivatives of 3,7,12-triketocholanic acid and their pharmaceutical salts having choleretic action and the pharmaceutical compositions containing the active compounds. They are prepared by well known methods usually used in peptide synthesis.

The present invention relates to α-amino acids derivatives of 3,7,12-triketocholanic acid, more particularly relates to $N^\alpha$-(3,7,12-triketocholanyl)-α-amino acids, represented by the following general formula:

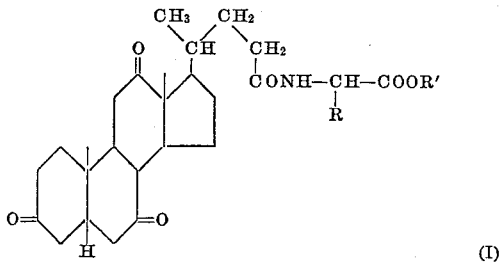

(I)

wherein R is a residue of α-amino acid having from four to about eleven carbon atoms and R' is a member selected from the group consisting of hydrogen, lower alkyl and aralkyl, and alkali metal salts thereof.

It has been well known that bile acids occur as bile salts, or sodium salt of conjugated acids in which the bile acid is combined with taurine or glycine in mammalian bile, and that the conjugated bile acids possess the physiological activities such as promotion of lipid absorption. It has been also known that 3,7,12-triketocholanic acid (the generic name is dehydrochloric acid and the name is occasionally used hereinunder) is easily prepared from cholic acid being a main component in human bile acid, by oxidation with chromium oxide in glacial acetic acid, and possesses a superior hydrocholeretic action but shows undesirable side effects such as lowering of the liver function. It has now been studing to find out a superior choleretic agent without side effects.

It is an object of the present invention to provide new α-amino acid derivatives of dehydrocholic acid having a superior choleretic action without undesirable side effects. It is another object of the present invention to provide pharmaceutical compositions containing the new compounds. Other objects will be apparent to those skilled in the art from the detailed description and claims to follow:

The α-amino acid moiety can be any member of α-amino acid having from four to about eleven carbon atoms, for example aspartic acid, asparagine, threonine, glutamic acid, glutamine, methionine, valine, leucine, isoleucine, cystine, lysine, arginine, histidine, tyrosine, phenylalanine and tryptophane.

The lower alkyl ester moiety has from one to about five carbon atoms. The examples are methyl, ethyl, propyl and butyl ester. The aralkyl ester are for example benzyl and phenethyl ester.

The preferable compounds of the present invention are 3,7,12-triketocholanyl-L-methionine, 3,7,12-triketocholanyl-L-leucine and their ethyl esters.

The compounds of the invention are prepared by the condensation of 3,7,12-triketocholanic acid with α-amino acid defined above or the lower alkyl or arolkyl ester using any method to be available in peptide synthesis.

In accordance with dicyclohexyl carbodiimide (DCC) method, 3,7,12-triketocholanic acid is condensed with approximately equimolar amount of α-amino acids lower alkyl esters in the presence of a little excess amount of dicyclohexyl carbodiimide to give $N^\alpha$-(3,7,12-triketocholanyl)-α-amino acids lower alkyl esters. The reaction may be carried out in an organic solvent such as dioxane and chloroform.

The lower alkyl or aralkyl esters of the invention are also prepared by the condensation of 3,7,12-triketocholanyl halides with α-amino acids lower alkyl or aralkyl esters in an organic solvent such as chloroform and benzene. Similarly, the desiring $N^\alpha$-(3,7,12-triketocholanyl)-α-amino acids or their lower alkyl or aralkyl esters may be prepared by the condensation of 3,7,12-triketocholanyl azides with α-amino acids or lower alkyl or aralkyl esters thereof in a suitable solvent such as water, an organic solvent miscible with water such as dioxane and tetrahydrofuran and the mixture of the organic solvent and water.

Furthermore, in accordance with the mixed anhydride method, the mixed anhydrides obtained by the reaction of 3,7,12-triketocholanic acids with lower alkyl chloroformates, for example ethyl chloroformate, at cooled temperature such as $-5°$ C. is also condensed with α-amino acids or lower alkyl or aralkyl esters thereof in a suitable solvent such as water, an organic solvent miscible with water such as dioxane and tetrahydrofuran and the mixture of the organic solvent and water to give the desiring $N^\alpha$-(3,7,12-triketocholanyl)-α-amino acids or their lower alkyl or aralkyl esters.

The reactions of the methods above-mentioned may be preferably carried out at room temperature or at lower temperature for a few hours. Both shorter and longer reaction time are operative.

The lower alkyl or aralkyl esters of $N^\alpha$-(3,7,12-triketocholanyl)-α-amino acids obtained above may be converted to free acids by de-esterification under usual conditions, such as hydrolysis by alkali metal hydroxide. The free acids may be further treated with alkali metal-hydroxide, -hydrocarbonate or -carbonate to convert to their alkali metal salts.

When the starting α-amino acids have further additional functional groups such as amino, carboxyl, hydroxy and mercapto groups than α-amino and carboxyl groups in the molecule, the functional groups may be generally protected by known protecting groups used in peptide synthesis, such as benzyloxycarbonyl, tert.-butyloxycarbonyl, tert.-amyloxycarbonyl, triphenylmethyl, acetyl, benzoyl and benzyl groups. After condensation reaction to protecting groups are optionally cleaved according to ordinary methods such as reduction by palladium catalyst or sodium liquid ammonia and hydrolysis by alkali metal hydroxide, anhydrous hydrochloric acid, anhydrous hydrobromic acid or anhydrous hydrofluoric acid.

In accordance with the present invention, the thus-obtained $N^\alpha$ - (3,7,12 - triketocholanyl) - α - amino acids and their lower alkyl or aralkyl esters of the Formula I and alkali metal salts thereof have been found to possess a superior choleretic action. Especially, it has been proved that these compounds promote not only a hepatic bile secretion (hydrocholeretic action) but also a hepatic excretion of biliary constituents (cholaneretic action), and that dehydrocholic acid does not, on the other hand, possesses the latter action and is therefore designated as hydrocholeretics.

Furthermore, even after the compounds of the present invention have been administered to patients for a long period, they have not induced undesirable side effects such as lowering of the liver function which is often observed in case of the administration of dehydrocholic acid. It has been unexpectedly found that the compounds of the invention have, on the contrary, even promotive activity of the liver function.

Animal test results of the compounds of the present invention are shown below in companion with dehydrocholic acid, α-amino acids and the mixture thereof.

Effects on the liver injury induced by carbon tetrachloride

Male rabbits weighing 2.5–3.0 kg. were used in the experiments. The test compounds were administered intramuscularly once a day in doses of 5 and 50 mg. per kg. of body weight per day for six consecutive days to the experimental animals. The animals were further given orally 1.0 ml. per kg. of body weight of a mixture of carbon tetrachloride in equivoluminal olive oil just before the second injection of the test compounds to produce liver impairment. Serum Bromsulphalein (BSP) retention tests were performed for two weeks after administration of carbon tetrachloride for the purpose of studying the change of rate of the liver injury induced by carbon tetrachloride and the effects of the test compounds on the liver injury. BSP dye was injected to the ear vein of rabbits in a dose of 10 mg. per kg. of body weight. BSP retention value in blood plasma was determined at 10 minutes after injection of the dye.

As shown in Table I, in normal rabbits, the BSP was rapidly excreted in the liver and remained only 4–5 percent at 10 minutes after the administration. On the other hand, in the group given carbon tetrachloride, the capacity of BSP-excretion of the liver was lowered and at the third day after the administration of carbon tetrachloride, BSP was least excreted. On the contrary, in groups administered the compounds of the present invention such as 3,7,12 - triketocholanyl - L - methionine and 3,7,12 - triketocholanyl - L - leucine, the lowering of the capacity of BSP-excretion of the liver was considerably prevented. It was not observed any such preventic activity in the groups administered dehydrocholic acid, α-amino acid such as L-methionine and L-leucine and the mixture thereof, and the conjugated compounds of dehydrocholic acid with α-amino acids having less than 3 carbon atoms.

Effects on the excretion of bile acid

Male rats weighing approximately 350 g. were used. The commonbile duct was cannulated and the test compounds were administered in dose of 500 mg. per kg. of body weight of the animals. After the administration of the test compounds, bile was collected at 30 minutes intervals. Bile acids were separated from bile collected and were divided to cholic acid(C) and dihydroxycholanic acid (DC) (mainly N - dehydroxycholic acid) according to thin-layer chromatography, and the quantities of each bile acid constituents were determined according to the modified method of Von H. Gänshrt et al. (Arzneimittel Forschung, vol. 10, pages 943–947, 1966). The results are shown in Table II.

Besides, to the rats previously administered orally the test compounds in dose of 500 mg. per kg. of body weight for five consecutive days, the common bile duct was cannulated at sixth day after the administration, and then the test compounds were administered once more. The collection and the quantification of bile acids were performed same manner as described above. The results are shown in Table III.

As shown in Tables II and III, in both groups given dehydrocholic acid and 3,7,12-triketocholanyl-L-methionine ethyl ester of the present invention, the excretion of the bile significantly increased in compared with that of normal rats. However, it should be noticed that in the group given dehydrocholic acid the biliary constituents in the bile were slightly increased, and that in the group given the compound of the present invention not only the excretion of bile but also the biliary constituents were considerably increased. These experimental results clearly demonstrate the facts that the compounds of the present invention possess both hydrocholeretic and cholaneretic action through dehydrocholic acid possess only hydrocholeretic action.

Furthermore, it should be noticed that the excretion of bile rather decreased in case of continuous administration of dehydrocholic acid for a long time in comparison with single administration, and that the quantity of bile acid and the ratio of bile acids constituents (C/DC) in the group given dehydrocholic acid were less than those in control rats. On the ther hand, in the group given the compounds of the present invention for a long time, both the excretion of bile and the quantity of bile acid increased as well as in the group given once, and any change of the ratio of bile acid constituents was not observed.

TABLE I

| Compounds | Number of rabbit | Doses (mg./kg.) | BSP retention value in percent Days after administration of CCl₄ | | | | | | | |
|---|---|---|---|---|---|---|---|---|---|---|
| | | | 1 | 2 | 3 | 4 | 5 | 6 | 10 | 14 |
| 3,7,12-triketocholanyl-L-methionine | 5 | 5 | 74 (±6) | 88 (±5) | 85 (±6) | 78 (±6) | 65 (±6) | 52 (±6) | 29 (±9) | 12 (±3) |
| | 5 | 50 | 58 (±6) | 70 (±4) | 74 (±4) | 63 (±6) | 59 (±5) | 43 (±5) | 20 (±5) | 9 (±6) |
| 3,7,12-triketocholanyl-L-leucine | 5 | 5 | 73 (±6) | 83 (±7) | 87 (±5) | 73 (±5) | 70 (±6) | 64 (±7) | 28 (±3) | 16 (±6) |
| | 5 | 50 | 70 (±6) | 82 (±5) | 84 (±5) | 70 (±5) | 60 (±5) | 52 (±6) | 21 (±6) | 13 (±5) |
| 3,7,12-triketocholanyl-L-methionine ethy ester | 5 | 5 | 82 (±6) | 84 (±7) | 84 (±5) | 68 (±7) | 62 (±6) | 54 (±5) | 30 (±5) | 15 (±6) |
| 3,7,12-triketocholanyl-L-glutamic acid | 5 | 5 | 84 (±4) | 92 (±6) | 92 (±10) | 82 (±7) | 73 (±6) | 65 (±5) | 32 (±6) | 17 (±3) |
| 3,7,12-triketocholanyl-glycine | 5 | 5 | 86 (±5) | 99 (±4) | 103 (±7) | 89 (±5) | 79 (±5) | 65 (±5) | 45 (±4) | 30 (±7) |
| Dehydrocholic acid | 5 | 50 | 84 (±5) | 103 (±6) | 98 (±7) | 83 (±5) | 75 (±8) | 65 (±4) | 41 (±5) | 23 (±6) |
| Dehydrocholic acid plus L-methionine (1:1) | 5 | 50 | 86 (±6) | 92 (±7) | 98 (±6) | 82 (±7) | 74 (±9) | 62 (±5) | 41 (±5) | 32 (±7) |
| Dehydrocholic acid plus L-leucine (1:1) | 5 | 50 | 82 (±7) | 95 (±8) | 102 (±7) | 81 (±7) | 73 (±6) | 64 (±4) | 42 (±5) | 28 (±4) |
| L-methionine | 5 | 50 | 81 (±7) | 96 (±6) | 101 (±5) | 85 (±6) | 72 (±7) | 65 (±5) | 42 (±5) | 24 (±5) |
| L-leucine | 5 | 50 | 87 (±6) | 95 (±8) | 102 (±5) | 83 (±7) | 71 (±6) | 63 (±6) | 40 (±6) | 22 (±5) |
| Control administered CCl₄ | 10 | | 85 (±6) | 102 (±7) | 98 (±5) | 82 (±4) | 74 (±6) | 68 (±5) | 38 (±7) | 22 (±4) |
| Normal rabbit | 5 | | 5 (±2) | | | | | | | |

TABLE II

| Compounds | Number of rats | Kinds | Bile acids (mg./30 minutes) | | | | | | Total amounts (mg./3 hrs.) | C/DC |
|---|---|---|---|---|---|---|---|---|---|---|
| | | | Time (minutes) | | | | | | | |
| | | | 0-30 | 30-60 | 60-90 | 90-120 | 120-150 | 150-180 | | |
| Control | 5 | DC | 3.22 | 2.71 | 2.28 | 1.34 | 1.28 | 1.33 | 12.16 | 1.95 |
| | | C | 5.53 | 4.72 | 3.87 | 3.70 | 3.15 | 2.56 | 23.53 | |
| | | Total | 8.75 (±0.70) | 7.43 (±1.36) | 6.15 (±0.87) | 5.04 (±0.66) | 4.43 (±0.67) | 3.89 (±0.60) | 35.69 (±2.29) | |
| | | Bile flow (drops per 5 min.) | 5 | 5 | 5 | 4 | 4 | 4 | | |
| 3,7,12-triketocholanyl-L-methionine ethyl ester | 5 | DC | 3.03 | 2.47 | 2.81 | 2.55 | 2.00 | 1.25 | 14.11 | 2.10 |
| | | C | 5.35 | 4.77 | 5.52 | 5.94 | 4.30 | 3.14 | 29.02 | |
| | | Total | 8.38 (±0.80) | 7.24 (±0.79) | 8.33 (±0.87) | 8.49 (±0.55) | 6.30 (±0.91) | 4.39 (±0.63) | 43.13 (±5.13) | |
| | | Bile flow (drops per 5 min.) | 6 | 9 | 14 | 17 | 13 | 9 | | |
| Dehydrocholic acid | 5 | DC | 2.60 | 2.13 | 1.60 | 1.76 | 1.44 | 1.10 | 10.63 | 2.08 |
| | | C | 5.69 | 4.60 | 4.03 | 3.04 | 2.44 | 2.66 | 22.46 | |
| | | Total | 8.29 (±1.02) | 6.73 (±0.94) | 5.63 (±0.06) | 4.80 (±0.65) | 3.88 (±1.20) | 3.76 (±0.39) | 33.09 (±3.14) | |
| | | Bile flow (drops per 5 min.) | 5 | 7 | 17 | 15 | 11 | 8 | | |

TABLE III

| Compounds | Number of rats | Kinds | Bile acids (mg./30 minutes) | | | | | | Total amounts (mg./3 hrs.) | C/DC |
|---|---|---|---|---|---|---|---|---|---|---|
| | | | Time (minutes) | | | | | | | |
| | | | 0-30 | 30-60 | 60-90 | 90-120 | 120-150 | 150-180 | | |
| Control | 5 | DC | 2.36 | 2.50 | 1.64 | 1.40 | 1.23 | 1.02 | 10.15 | 2.19 |
| | | C | 5.90 | 5.15 | 3.84 | 2.87 | 2.80 | 2.70 | 23.26 | |
| | | Total | 8.26 (±0.82) | 7.65 (±0.93) | 5.48 (±0.90) | 4.27 (±0.71) | 4.03 (±0.54) | 3.72 (±0.48) | 33.41 (±3.14) | |
| | | Bile flow (drops per 5 min.) | 5 | 5 | 5 | 4 | 4 | 4 | | |
| 3,7,12-triketocholanyl-L-methionine ethyl ester | 5 | DC | 2.67 | 2.06 | 2.71 | 2.19 | 2.10 | 1.70 | 13.43 | 2.02 |
| | | C | 4.95 | 4.20 | 5.14 | 5.52 | 4.24 | 3.08 | 27.13 | |
| | | Total | 7.62 (±0.82) | 6.26 (±0.91) | 7.85 (±0.67) | 7.71 (±0.58) | 6.34 (±0.63) | 4.78 (±0.57) | 40.56 (±3.75) | |
| | | Bile flow (drops per 5 min.) | 6 | 8 | 15 | 16 | 12 | 8 | | |
| Dehydrocholic acid | 5 | DC | 3.15 | 2.91 | 2.10 | 2.80 | 1.46 | 1.53 | 13.95 | 0.94 |
| | | C | 2.97 | 2.62 | 2.49 | 2.11 | 1.35 | 1.64 | 13.18 | |
| | | Total | 6.12 (±1.16) | 5.53 (±1.24) | 4.59 (±0.92) | 4.91 (±0.82) | 2.81 (±0.58) | 3.17 (±0.63) | 27.13 (±4.83) | |
| | | Bile flow (drops per 5 min.) | 5 | 7 | 13 | 13 | 8 | 6 | | |

Thus, the compounds of the present invention possess superior cholaneretic and hydrocholeretic action and are readily adapted to therapeutic use as cholagogues in human and other animals. Furthermore, the toxicity of these compounds has been found to be quite low when they are administered to mice in amounts that are sufficient to achieve the desired effects and even in large excess amounts. For example, the compounds of the present invention were administered intravenously to mice in dose of 1000 mg. per kg. of body weight for a week and it has never been observed any undesirable toxic symptom. Moreover, it has never been observed any other harmful pharmacological side effect such as lowering of the liver function as often observed in case of the administration of dehydrocholic acid.

In accordance with a method of treatment of the present invention, the compounds of the invention can be administered by oral, intraveneous or intramuscular routes. These compounds are preferably administered in doses ranging from about 5 mg. to about 100 mg. per kg. of body weight per day, although variations will necessarily occur depending upon the weight of the subject being treated and particular route of administration chosen. However, the most preferable dosage level in order to achieve effective results is in the range of from about 10 mg. to about 30 mg. per kg. of body weight per day.

The compounds of the present invention may be administered either alone or in combination with a pharmaceutically acceptable carrier by either of the routes previously indicated. More particularly, these compounds may be administered in a widely of dosage forms, i.e. tablets, capsules, powders, aqueous solution, syrups and the like.

For purposes of oral administration, tablets containing various excipients such as sodium citrate, lactose, microcrystalline cellulose and starch, may be employed, together with binding agents such as starch paste, furthermore, with lubricating agents such as magnesium stearate, sodium lauryl sulfate and talc. Solid composition of a similar type may also be employed as fillers in soft and hard-shelled gelatin capsules. For purposes of intraveneous administration, the compounds of the present invention, especially the alkali metal salts, may be employed in a form of an aqueous solution, preferably about 5% solution. Such an aqueous solution should be suitably buffered if necessary and the liquid diluent rendered isotonic with sufficient glucose or saline.

The following examples will be illustrative of the compounds and a pharmaceutical composition of the invention and of the procedure for their preparation.

EXAMPLE I

3,7,12-triketocholanyl-L-methionine ethyl ester (a) *Acide chloride method.*—To a suspension of 135 g. of 3,7,12-triketocholanic acid in 5.40 l. of absolute benzene was added 135 ml. of thionyl chloride. After stirring at reflux temperature for one hour and allowing to stand at room temperature for further one hour, the mixture was distilled under the reduced pressure to remove benzene. A solution of 250 ml. of absolute benzene was added to the residue and the solution was distilled off to remove benzene. This operation was repeated twice. Thus obtained 3,7,12-triketocholanyl chloride was dissolved in 3.20 l. of chloroform (not include ethanol). To the solution was gradually added under the cooled condition with stirring a solution of 108 g. of L-methionine ethyl ester hydrochloride in 0.8 l. of chloroform (not include ethanol) and followed by 224 ml. of triethylamine. The reaction mixture was allowed to stand at room temperature overnight and washed with 800 ml. of water saturated with sodium chloride for three times to remove triethylamine hydrochloride. The mixture was further washed with 5% aqueous sodium carbonate solution, 3% hydrochloric acid and water, and dried with anhydrous sodium sulfate. The residue obtained after removal of chloroform was added to ethyl acetate. The mixture was filtered to give 158 g. of crude crystals of the desired compound. This product was recrystallized from acetone. Yield 128.0 g.; melting point 190–192° C.; $[\alpha]_D^{25}+38.4°(C=0.99,$ chloroform).

*Analysis.*—Calcd. for $C_{31}H_{47}O_6$ NS (percent): C, 66.28; H, 8.43; N, 2.49; S, 5.71. Found (percent): C, 65.94; H, 8.28; N, 2.28; S, 5.66.

(b) *DCC method.*—To a solution of 64.0 g. of L-methionine ethyl ester hydrochloride in 400 ml. of chloroform (not include ethanol) was added 30 g. of triethylamine. The mixture was stirred at room temperature for 30 minutes. To the mixture, 100 g. of 3,7,12 - triketocholanic acid and further a solution of 62 g. of dicyclohexylcarbodiimide (DCC) in 100 ml. of chloroform (not include ethanol) were added under ice-cooling. The mixture was stirred at room temperature for two hours and allowed to stand in refrigerator overnight. The N,N'-dicyclohexyl urea which appeared was then removed by filtration and 5 ml. of glacial acetic acid was added to the filtrate. The solution was allowed to stand at room temperature for 5 minutes, washed with water and dried with anhydrous sodium sulfate. The residue obtained after removal of the solvent was crystallized from methanol. The crude product was recrystallized from chlorofrom-methanol to give 124 g. of the desired product. This product showed same physical constants as described in (a).

EXAMPLE II

3,7,12-triketocholanyl-L-methionine

To 700 ml. of 10% potassium hydroxide-ethanol solution was suspended 40 g. of 3,7,12-triketocholanyl-L-methionine ethyl ester. The suspension was stirred at room temperature for two hours and then acidified with hydrochloric acid. The crystals which separated were collected by filtration, washed with water, dried in vacuo and recrystallized from aqueous acetone to yield 27.5 g. of the product. Melting point 209–210° C.; $[\alpha]_D^{25}+26.6°$ (C=1.03, chloroform)

*Analysis.*—Calcd. for $C_{29}H_{43}O_6NS$ (percent): C, 65.26; H, 8.12; N, 2.62; S, 6.01. Found (percent): C, 65.46; H, 8.15; N, 2.63; S, 5.81.

EXAMPLE III

3,7,12-triketocholanyl-L-leucine

To a solution of 1.6 g. of L-leucine ethyl ester in pyridine, 4 g. of 3,7,12-triketocholanyl chloride was added under ice-cooling. The mixture was allowed to stand overnight and distilled under reduced pressure to remove pyridine. The residue was washed with n-hexane. The crude product of 3,7,12-triketocholanyl-L-leucine ethyl ester was hydrolyzed according to same manner as described in Example II. The resulting material was recrystallized from ethanol. Yield 4.1 g.; melting point 197.5–199° C.

*Analysis.*—Calcd. for $C_{30}H_{45}O_6N$ (percent): C, 69.87; H, 8.80; N, 2.72. Found (percent): C, 69.29; H, 9.41; N, 2.62.

EXAMPLE IV

3,7,12-triketocholanyl-L-aspartic acid

To 100 ml. of ice water were suspended 0.4 g. of L-aspartic acid and 1.2 g. of 3,7,12-triketocholanyl azide prepared from 3,7,12-triketocholanyl chloride by the well-known procedure. To the mixture, N/2 aqueous sodium hydroxide solution was added dropwise with stirring until the mixture became clear. The reaction mixture was warmed for a few minutes, acidified with diluted hydrochloric acid and allowed to stand in refrigerator overnight. The crystals which appeared were collected by filtration and recrystallized from ethanol. Yield 0.3 g.; melting point 147–149° C.

*Analysis.*—Calcd. for $C_{28}H_{39}O_8N$ (percent): C, 64.97; H, 7.60; N, 2.71. Found (percent): C, 64.69; H, 7.72; N, 2.63.

EXAMPLE V

3,7,12-triketocholanyl-L-glutamic acid

To a solution of 3.3 g. of L-glutamic acid dibenzyl ester in 300 ml. of dioxane was added 4 g. of 3,7,12-triketocholanic acid. The mixture was treated in the same way described in Example I, (b) to give 3,7,12-triketocholanyl-L-glutamic acid dibenzyl ester. The product in ethanol was hydrogenated on palladium-carbon catalyst with 2 molar equivalents of hydrogen. After filtering, the solution was concentrated to dryness, and the residue was recrystallized from ethyl acetate. Yield 2.1 g.; melting point 143.5° C. (decomp.)

*Analysis.*—Calcd. for $C_{29}H_{41}O_8N$ (percent): C, 65.51; H, 7.77; N, 2.63. Found (percent): C, 65.67; H, 7.59; N, 2.72.

EXAMPLE VI

Tablets were made of the following formulation

|  | mg. |
|---|---|
| 3,7,12-triketocholanyl-L-methionine ethyl ester | 100 |
| Lactose | 118 |
| Microcrystalline cellulose | 80 |
| Corn starch | 40 |
| Corn starch (for paste) | 12 |
| Talc | 8 |
| Magnesium stearate | 2 |
| Total | 360 |

100 parts of 3,7,12-triketocholanyl-L-methionine ethyl ester, 118 parts of lactose, 80 parts of microcrystalline cellulose and 40 parts of corn starch were mixed and granulated with a starch paste. The mixture was passed through a 16 mesh screen. The wet granulate was dried. The resulting dried granulate was mixed with 8 parts of talc and 2 parts of magnesium stearate and tableted in the usual way.

EXAMPLE VII

A mixture of 3.0 g. of 3,7,12-triketocholanyl-L-methionine, 2.6 ml. of 10% aqueous sodium hydroxide and 40 ml. of distilled water was heated at 40° C. to be completely dissolved, and then distilled water was further added to the solution. (Total volume of the solution. 60 ml.; pH 11.7.) After cooling to room temperature, it is sterilized by means of filtration through a Seitz filter. The sterile aqueous solution so obtained is suitable for intravenous administration to animals.

What is claimed is:

1. A compound selected from the group consisting of compounds having the formula

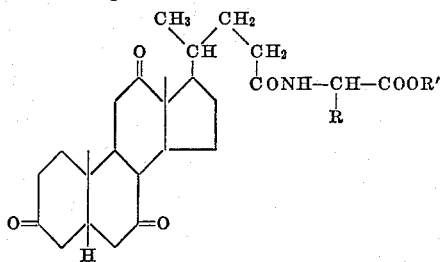

wherein R is a residue of an α-amino acid selected from the group consisting of aspartic acid, asparagine, threonine, glutamic acid, glutamine, methionine, valine, leucine, isoleucine, cystine, lysine, arginine, histidine, tyrosine, phenylalanine and tryptophane, and R' is a member selected from the group consisting of hydrogen, lower alkyl and aralkyl, and alkali metal salts thereof.

2. 3,7,12-triketocholanyl-L-methionine ethyl ester.
3. 3,7,12-triketocholanyl-L-methionine.
4. 3,7,12-triketocholanyl-L-leucine.
5. 3,7,12-triketocholanyl-L-glutamic acid.

No references cited.

HENRY A. FRENCH, Primary Examiner

U.S. Cl. X.R.
424—242